(12) United States Patent
Hsu (10) Patent No.: US 9,458,652 B2
(45) Date of Patent: Oct. 4, 2016

(54) DUAL-SHAFT SYNCHRONOUS MOVEMENT DEVICE AND ASSEMBLING METHOD THEREOF

(71) Applicant: FIRST DOME CORPORATION, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 176 days.

(21) Appl. No.: 14/522,900

(22) Filed: Oct. 24, 2014

(65) Prior Publication Data

US 2015/0040362 A1   Feb. 12, 2015

Related U.S. Application Data

(62) Division of application No. 13/867,258, filed on Apr. 22, 2013.

(30) Foreign Application Priority Data

Feb. 8, 2013   (TW) .............................. 102105149 A (51) Int. Cl.
    *B23P 19/00*    (2006.01)
    *E05D 3/06*    (2006.01)
    *E05D 7/00*    (2006.01)
    *G06F 1/16*    (2006.01)

(52) U.S. Cl.
CPC . *E05D 3/06* (2013.01); *E05D 7/00* (2013.01); *G06F 1/1681* (2013.01); *E05Y 2900/606* (2013.01); *G06F 1/1618* (2013.01); *Y10T 16/5257* (2015.01); *Y10T 16/53864* (2015.01); *Y10T 16/547* (2015.01); *Y10T 29/24* (2015.01)

(58) Field of Classification Search
CPC .. Y10T 29/24; Y10T 29/53913; B23P 19/12; B23P 19/08; B23P 19/10; B23P 15/00; G06F 1/1618
See application file for complete search history.

(56) References Cited

U.S. PATENT DOCUMENTS 6,519,812 B2 *   2/2003   Ko ...................... H04N 5/2251
                                                          16/248

* cited by examiner

*Primary Examiner* — Jason L Vaughan
*Assistant Examiner* — Amanda Meneghini
(74) *Attorney, Agent, or Firm* — Rosenberg, Klein & Lee (57) ABSTRACT

A dual-shaft synchronous movement device and an assembling method thereof. The dual-shaft synchronous movement device includes a first shaft and a second shaft, which are assembled with each other and synchronously rotatable. The invention includes providing an assembling device and arranging on the assembling device a first rotor and a second rotor (or a third rotor and a fourth rotor) between which a drive section is wound; winding the drive section onto the first and second rotors (or the third and fourth rotors) in a tensioned state; and pushing the first and second rotors (or the third and fourth rotors) onto the first and second shafts. Through the first and second rotors (or the third and fourth rotors) and the drive section, when the first shaft is rotated, the second shaft is synchronously rotated.

18 Claims, 6 Drawing Sheets

DUAL-SHAFT SYNCHRONOUS MOVEMENT DEVICE AND ASSEMBLING METHOD THEREOF

REFERENCE TO RELATED APPLICATION

This application is being filed as a Divisional application of Ser. No. 13/867,258, filed 22 Apr. 2013, currently pending.

BACKGROUND OF THE INVENTION

1. Field of the Invention

The present invention relates to a dual-shaft synchronous movement device and an assembling method thereof. The dual-shaft synchronous movement device includes a first shaft and a second shaft, which are assembled with each other and synchronously rotatable. In the assembling method, an assembling device is provided to assemble multiple rotors and drive sections with a first shaft and a second shaft to form the dual-shaft synchronous movement device. Through the rotors and the drive sections, when the first shaft is rotated, the second shaft is synchronously rotated.

2. Description of the Related Art

There are various electronic apparatuses provided with covers or display screens or viewers, such as mobile phones, notebooks, PDA, digital imagers and electronic books. The covers or display screens or viewers are pivotally mounted on the electronic apparatuses via pivot pins or rotary shafts, whereby the covers or display screens or viewers can be freely rotated and opened/closed under external force.

In order to operate the display module (such as the screen) and/or the apparatus body module of the electronic apparatus in more operation modes and application ranges, a dual-shaft mechanism is provided between the display module and the apparatus body module, whereby the display module and/or the apparatus body module can be operated in different operation modes by different rotational angles.

In the above conventional pivot pin structures or rotary shaft structures, generally multiple gaskets with through holes and recessed/raised locating sections, multiple frictional plates and multiple cooperative springs are assembled on the rotary shaft. Two ends of the rotary shaft are respectively fixed by means of retainer rings or retainer members. The springs serve to store energy and release the energy to achieve the objects of rotating and locating the rotary shaft or pivot pin assembly.

The conventional rotary shaft structures and the relevant connection components thereof have some shortcomings in use and structural design that need to be overcome. It is therefore tried by the applicant to provide a dual-shaft synchronous movement device and an assembling method thereof to eliminate the shortcomings existing in the conventional rotary shaft structure so as to widen the application range and facilitate the assembling process of the rotary shaft structure.

The dual-shaft synchronous movement device of the present invention has the following advantages:

1. The synchronous movement device of the present invention is mounted between the display module and the apparatus body module. When an operator 0°~180° rotates the display module, the apparatus body module is synchronously relatively 0°~180° rotated. Therefore, the total rotational angle of the display module and the apparatus body module is 360°. Accordingly, the operator can more quickly and conveniently operate the electronic apparatus in more operation modes (or application ranges).

2. The synchronous movement device of the present invention is free from any of the gaskets with through holes and recessed/raised locating sections and the frictional plates as well as the springs employed in the conventional rotary shaft structures.

3. In the assembling method of the synchronous movement device of the present invention, an assembling device is provided to easily assemble the synchronous movement device with two shafts, whereby the two shafts can be synchronously rotated.

SUMMARY OF THE INVENTION

It is therefore a primary object of the present invention to provide a dual-shaft synchronous movement device and an assembling method thereof. The dual-shaft synchronous movement device includes a first shaft and a second shaft, which are assembled with each other and synchronously rotatable. The assembling method includes steps of: providing an assembling device and arranging on the assembling device a first rotor and a second rotor (or a third rotor and a fourth rotor) between which a drive section is wound; rotating at least one of the first and second drive shafts to wind the drive section onto the first and second rotors (or the third and fourth rotors) in a tensioned state; and pushing the first and second rotors (or the third and fourth rotors) onto the first and second shafts. Through the first and second rotors (or the third and fourth rotors) and the drive section, when the first shaft is rotated, the second shaft is synchronously rotated.

In the above dual-shaft synchronous movement device, a first rotor and a third rotor are disposed on the first shaft and a second rotor and a fourth rotor are disposed on the second shaft. A drive section is disposed between the first and second rotors and another drive section is disposed between the third and fourth rotors. When the first shaft drives the first and third rotors to rotate, the drive section drives the second rotor to rotate in a direction reverse to the rotational direction of the first rotor. At the same time, the fourth rotor makes the other drive section drive the third rotor to rotate, whereby the first and second shafts are synchronously rotated.

In the above dual-shaft synchronous movement device, the drive sections are in the form of flexible wires, each having a first end and a second end. The first and second ends are respectively fixedly wound on the first rotor (the third rotor) and the second rotor (the fourth rotor).

The assembling method for the dual-shaft synchronous movement device of the present invention includes steps of: providing an assembling device and arranging a first rotor and a second rotor (or a third rotor and a fourth rotor) on the assembling device, the assembling device including a base section, two drive shafts (first and second drive shafts) disposed on the base section and a push section, the push section being reciprocally movable along the drive shafts, the first and second rotors (or the third and fourth rotors) being formed with shaft holes for mounting the first and second rotors (or the third and fourth rotors) on the first and second drive shafts; rotating at least one of the first and second drive shafts to drive the first and second rotors (or the third and fourth rotors) to rotate so as to wind the drive section on the first and second rotors (or the third and fourth rotors) in a tensioned state, the drive section being wound on the first rotor by a length larger than a length by which the drive section is wound on the second rotor, the drive section being wound on the third rotor by a length smaller than a length by which the drive section is wound on the fourth rotor; and aligning the first and second drive shafts of the assembling device with the first and second shafts and driving the push section to move forward along the first and second drive shafts so as to push the first and second rotors (or the third and fourth rotors) onto the first and second shafts and forcedly make the first and second shafts fitted into the shaft holes to complete the assembling process of the synchronous movement device on the first and second shafts.

The present invention can be best understood through the following description and accompanying drawings, wherein:

DETAILED DESCRIPTION OF THE PREFERRED EMBODIMENTS

Figure 1:
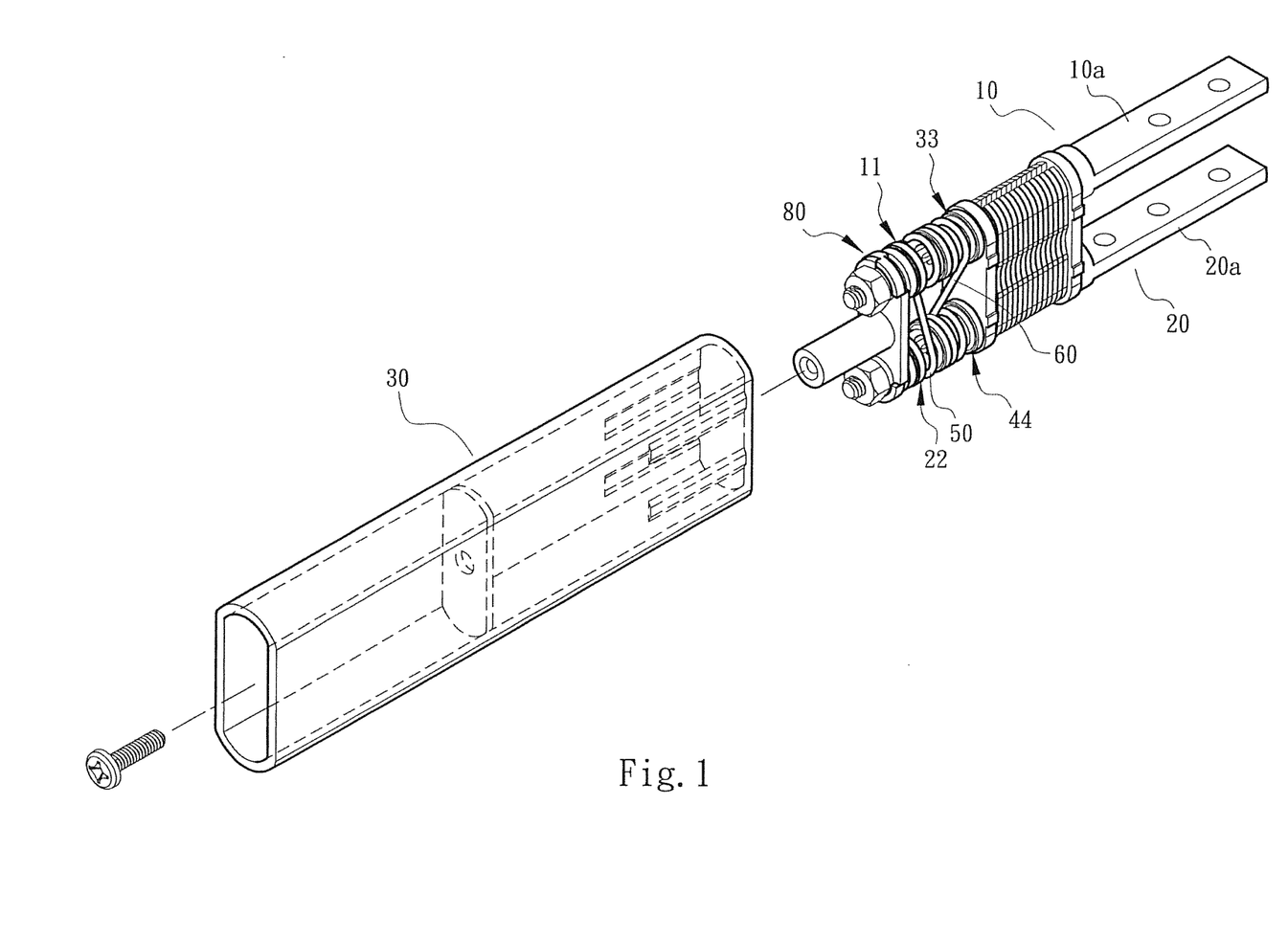
FIG. 1 is a perspective view showing the synchronous movement device of the present invention and the casing thereof, in which the first and second shafts and the first to fourth rotors and the drive sections are assembled with each other.
Figure 2:
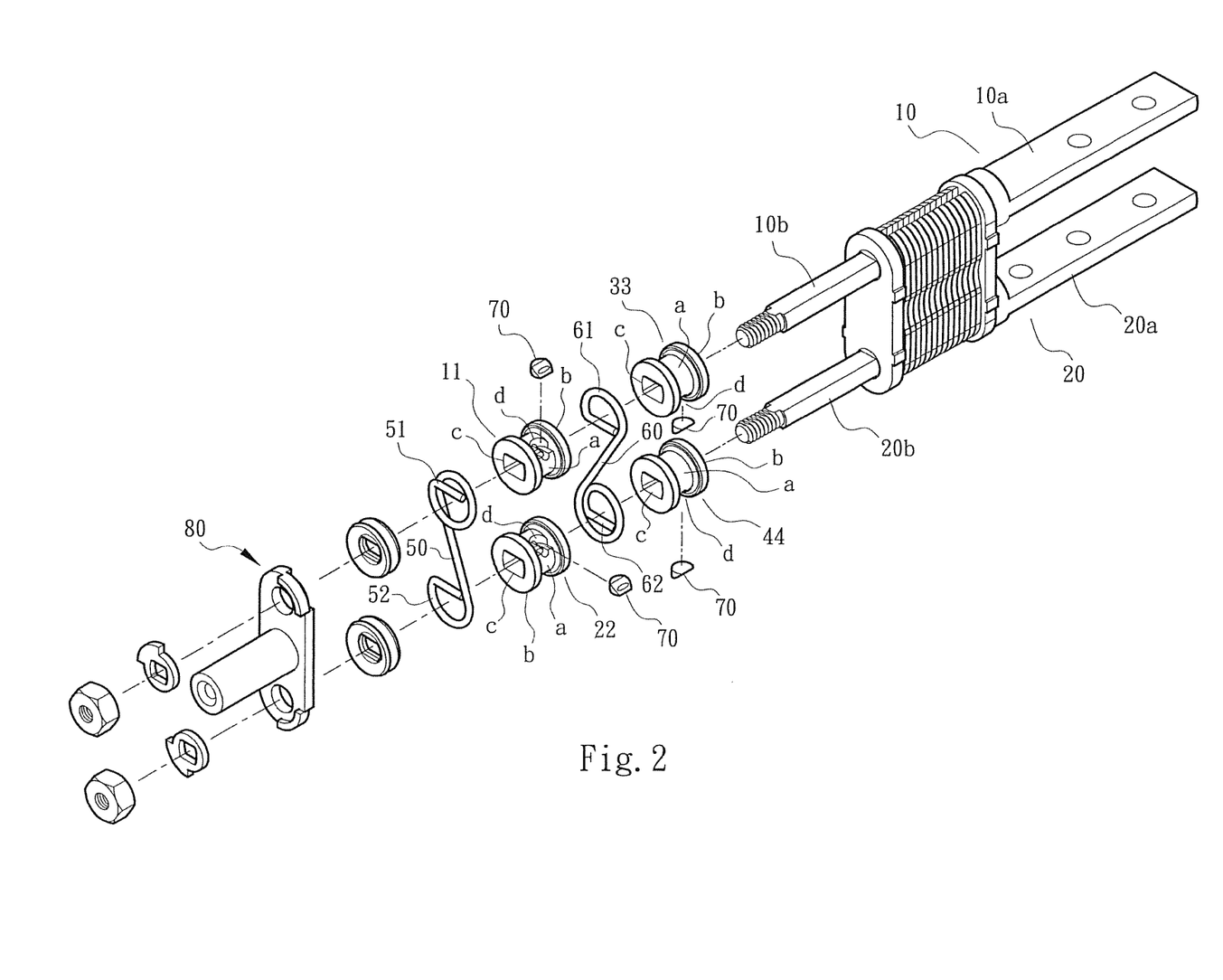
FIG. 2 is a perspective exploded view of the synchronous movement device of the present invention.
Figure 3:
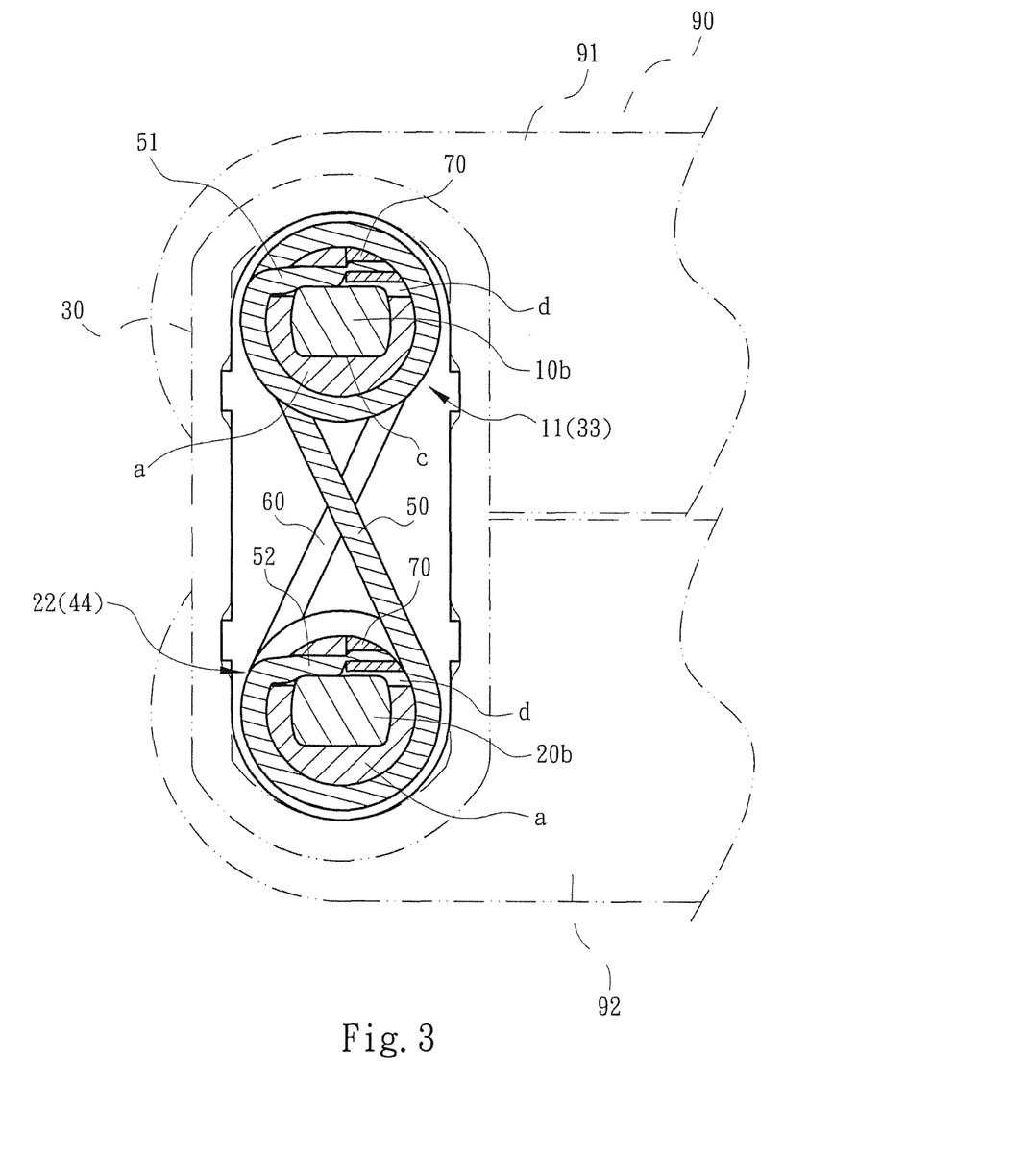
FIG. 3 is a sectional view according to FIG. 1, in which the phantom lines show the display module and the apparatus body module.

Please refer to FIGS. 1, 2 and 3. The dual-shaft synchronous movement device of the present invention includes a first shaft 10 and a second shaft 20. The first and second shafts 10, 20 are assembled with each other and disposed in a casing 30. Each of the first and second shafts 10, 20 has a fixed end 10*a*, 20*a* and a pivoted end 10*b*, 20*b*. In cooperation with fixing seats (not shown), the fixed ends 10*a*, 20*a* of the first and second shafts 10, 20 are respectively fixed on a display module 91 and an apparatus body module 92 of an electronic apparatus 90 (such as a mobile phone or a computer).

Referring to FIGS. 1, 2 and 3, the pivoted end 10*b* of the first shaft 10 is provided with a first rotor 11 and a third rotor 33 and the pivoted end 20*b* of the second shaft 20 is provided with a second rotor 22 and a fourth rotor 44. Drive sections 50, 60 are disposed between the first, second, third and fourth rotors 11, 22, 33, 44. The first, second, third and fourth rotors 11, 22, 33, 44 and the drive sections 50, 60 are assembled on the first and second shafts 10, 20 in cooperation with a fixing assembly 80. For easy illustration, the drive section 50 is defined as drive section A, while the drive section 60 is defined as drive section B.

In this embodiment, the first, second, third and fourth rotors 11, 22, 33, 44 are in the form of rollers, each having a cylindrical main body *a* and two shoulder sections *b* formed at two ends of the main body *a*. The width (or diameter) of the main body *a* is smaller than the width (or diameter) of the shoulder sections *b*.

Each of the first, second, third and fourth rotors 11, 22, 33, 44 has a shaft hole *c*. The shaft hole *c* has a configuration identical to the cross-sectional shape of the pivoted ends 10*b*, 20*b* of the first and second shafts. For example, as shown in the drawings, the pivoted ends 10*b*, 20*b* of the first and second shafts (or the shaft holes *c*) have a rectangular cross section and the pivoted ends 10*b*, 20*b* of the first and second shafts 10, 20 are connected in the shaft holes *c*, whereby the first and third rotors 11, 33 are rotatable along with the first shaft 10 and the second and fourth rotors 22, 44 are rotatable along with the second shaft 20.

Please refer to FIGS. 1, 2 and 3. The drive section A 50 is disposed between the first and second rotors 11, 22 and the drive section 60 B is disposed between the third and fourth rotors 33, 44. The drive sections A and B 50, 60 are in the form of inextensible and flexible wires, each having a first end 51, 61 and a second end 52, 62. The drive section A 50 (and the first end 51) is fixedly wound on the main body *a* of the first rotor 11. The drive section A 50 and the second end 52 are fixedly wound on the main body *a* of the second rotor 22. The drive section B 60 (and the first end 61) is fixedly wound on the main body *a* of the third rotor 33. The drive section B 60 (and the second end 62 are fixedly wound on the main body *a* of the fourth rotor 44.

In this embodiment, the main bodies *a* of the first, second, third and fourth rotors 11, 22, 33, 44 are formed with pinholes *d*. The first and second ends 51, 61, 52, 62 of the drive sections A and B 50, 60 pass through the pinholes *d* to connect with retainer sections 70. Accordingly, the first and seconds 51, 61, 52, 62 of the drive sections A and B 50, 60 are prevented from detaching from the first, second, third and fourth rotors 11, 22, 33, 44. In addition, the shoulder sections *b* restrict the drive sections A and B 50, 60 from slipping away from the first and second rotors 11, 22 or the third and fourth rotors 33, 44.

Please refer to FIGS. 1, 2 and 3. The drive section A 50 is wound on the first and second rotors 11, 22 in a direction reverse to the direction in which the drive section B 60 is wound on the third and fourth rotors 33, 44. For example, FIG. 3 shows that the drive section A 50 is wound from the left side of the first rotor 11 (according to the drawing) to the right side of the second rotor 22 in a direction reverse to the direction in which the drive section B 60 is wound from the right side of the third rotor 33 to the left side of the fourth rotor 44. According to the above arrangement, the first and second shafts 10, 20 will rotate in different directions.

Please refer to FIG. 3, which shows that the display module 91 is closed onto the apparatus body module 92 with the angle contained therebetween 0°. When an operator opens the display module 91 to make the first shaft 10 drive the first rotor 11 (or the third rotor 33) to counterclockwise rotate according to the drawing, the drive section A 50 drives the second rotor 22 to forcedly make the second shaft 20 rotate in a direction reverse to the moving direction of the first rotor 11, (that is, clockwise rotate). At the same time, the fourth rotor 44 is forcedly clockwise rotated, whereby the drive section B 60 cooperates with the third rotor 33 to counterclockwise rotate. Accordingly, the first and second shafts 10, 20 are synchronously rotated.

Therefore, when the operator opens the display module 91 to make the first shaft 10 counterclockwise rotate to a 180° position, the first, second, third and fourth rotors 11, 22, 33, 44 cooperate with the drive sections A and B 50, 60 to transmit the force and make the second shaft 20 as well as the apparatus body module 92 synchronously clockwise rotate to a 180° position. That is, the display module 91 and the apparatus body module 92 are totally relatively rotated by 360°.

That is, by means of the synchronous movement device, a user can operate and rotate the display module 91 by a certain angle or range to achieve a travel double the rotational angle or range. Accordingly, the user can more quickly and conveniently operate the electronic apparatus.

In a preferred embodiment, the drive section A 50 has such a length that after the first rotor 11 is 180° rotated along with the first shaft 10, the drive section A 50 (or the first end 51) is still wound on the first rotor 11 by a length at least equal to or larger than ½ circumferential length of the first rotor 11. That is, after the first rotor 11 is 180° rotated, the drive section A 50 (or the first end 51) is still wound on the first rotor 11 by a length equal to or larger than the length of 90° arc of the first rotor 11.

It should be noted that the drive section B 60 has such a length that after the fourth rotor 44 is 180° rotated along with the second shaft 20, the drive section B 60 (or the second end 62) is still wound on the fourth rotor 44 by a length at least equal to or larger than ½ circumferential length of the fourth rotor 44. That is, after the fourth rotor 44 is 180° rotated, the drive section B 60 (or the second end 62) is still wound on the fourth rotor 44 by a length equal to or larger than the length of 90° arc of the fourth rotor 44.

It should be noted that the drive section 50 (or 60) is tightly wound on the first and second rotors 11, 22 (or the third and fourth rotors 33, 44) to transmit the force. During the force transmission process, the drive section 50 (or 60) is frictionally assembled with the main body a to minimize the possibility of torque change or slippage that often happens in the conventional device. In this case, the first and second shafts 10, 20 can be smoothly rotated. Moreover, once the rotational force disappears, the rotors stop rotating to be located in a desired position.

Figure 4:
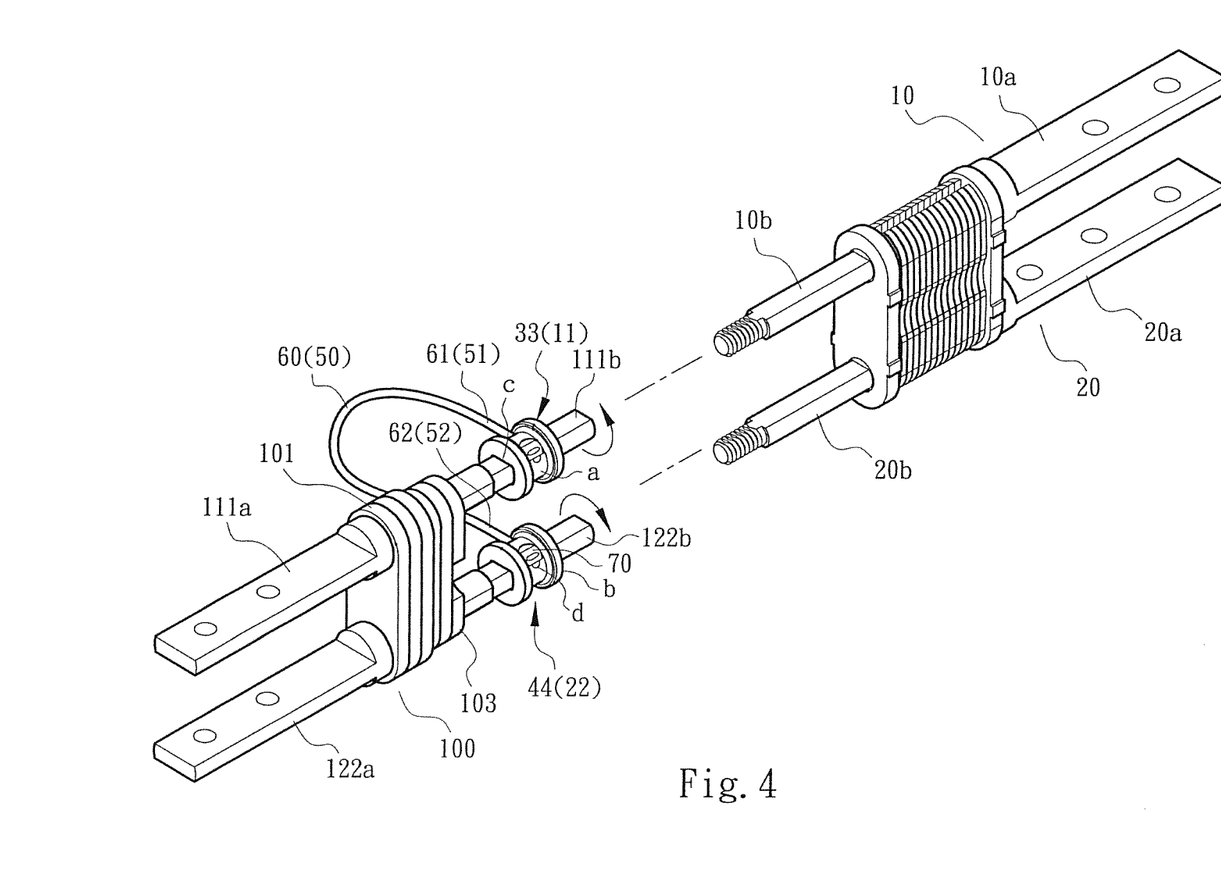
FIG. 4 is a perspective view showing a step of the assembling method of the synchronous movement device of the present invention, in which the first and second rotors (or the third and fourth rotors) are arranged on the assembling device.
Figure 5:
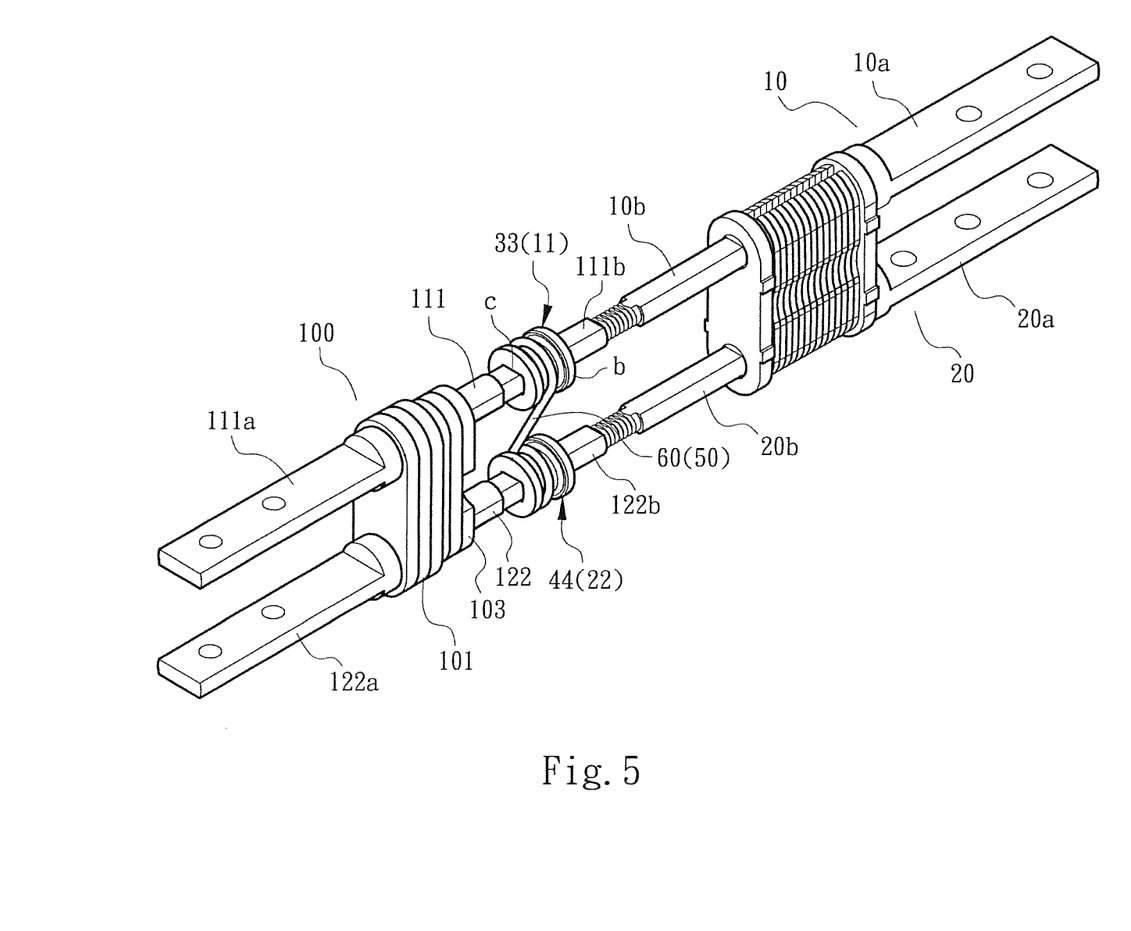
FIG. 5 is a perspective view showing another step of the assembling method of the synchronous movement device of the present invention, in which the first and second drive shafts of the assembling device rotate the first and second rotors (or the third and fourth rotors) to tension the drive section.
Figure 6:
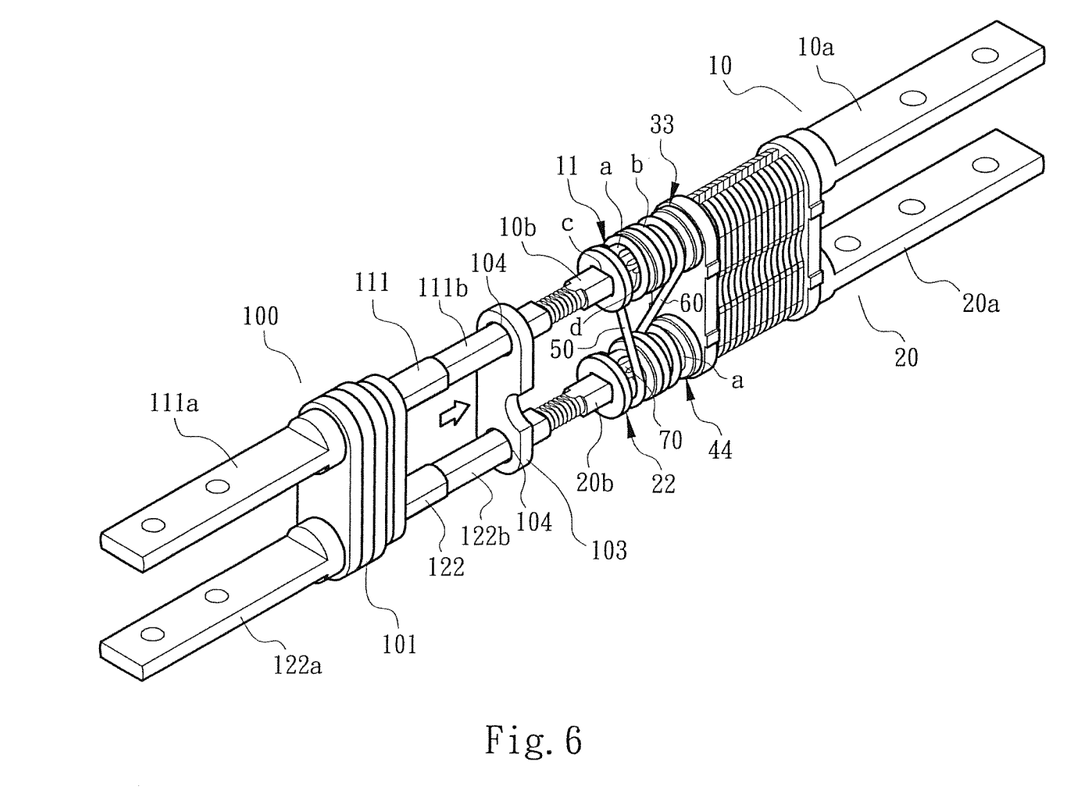
FIG. 6 is a perspective view showing still another step of the assembling method of the synchronous movement device of the present invention, in which the push section of the assembling device pushes the first and second rotors (or the third and fourth rotors) onto the first and second shafts.

Please now refer to FIGS. 4, 5 and 6. The assembling method for the dual-shaft synchronous movement device of the present invention includes steps of:

a. providing an assembling device 100 and arranging the first and second rotors 11, 22 provided with the drive section A 50 (or the third and fourth rotors 33, 44 provided with the drive section B 60) on the assembling device 100, the assembling device 100 including a base section 101, two drive shafts 111, 122 disposed on the base section 101 and a push section 103, the push section 103 being reciprocally movable along the drive shafts, each of the first and second drive shafts 111, 122 having a drive end 111a, 122a and a pivoted end 111b, 122b, the pivoted ends 111b, 122b having a cross-sectional shape identical to the cross-sectional shape of the pivoted ends 10b, 20b of the first and second shafts and the configuration of the shaft holes c of the first and second rotors 11, 22 (or the third and fourth rotors 33, 44), in this embodiment, the push section 103 having the form of a board block having two assembling holes 104, the pivoted ends 111b, 122b of the first and second drive shafts 111, 122 being respectively fitted in the assembling holes 104, whereby the push section 103 is reciprocally movably assembled on the pivoted ends 111b, 122b of the first and second drive shafts 111, 122, the first and second rotors 11, 22 (or the third and fourth rotors 33, 44) being respectively arranged on the pivoted end 111b of the first drive shaft 111 and the pivoted end 122b of the second drive shaft 122 as shown in FIG. 4, at this time, the drive section A 50 (or the drive section B 60) being in a loosened state;

b. rotating the drive shafts of the assembling device, that is, rotating at least one of the first and second drive shafts 111, 122 to drive at least one of the first and second rotors 11, 22 and/or the third and fourth rotors 33, 44 to rotate, whereby the drive section A 50 (or the drive section B 60) is wound on the first and second rotors 11, 22 (or the third and fourth rotors 33, 44) in a tensioned state as shown in FIG. 5, in this embodiment, in cooperation with the winding direction of the first and second rotors 11, 22 (or the third and fourth rotors 33, 44), the first and second drive shafts 111, 122 being rotated in the same direction by means of the power applied to the drive ends 111a, 122a, in practice, as necessary, the first and second drive shafts 111, 122 being synchronously and/or asynchronously rotatable in the same and/or different directions, in this embodiment, the drive section A 50 being wound on the first rotor 11 by a length larger than the length by which the drive section A 50 is wound on the second rotor 22, and the drive section B 60 being wound on the third rotor 33 by a length smaller than the length by which the drive section B 60 is wound on the fourth rotor 44; and c. aligning the pivoted ends 111b, 122b of the first and second drive shafts 111, 122 of the assembling device 100 with the pivoted ends 10b, 20b of the first and second shafts 10, 20 as shown in FIG. 6 and driving the push section 103 to move forward along the first and second drive shafts 111, 122 so as to push the first and second rotors 11, 22 (or the third and fourth rotors 33, 44) onto the first and second shafts 10, 20 and forcedly make the pivoted ends 10b, 20b of the first and second shafts fitted into the shaft holes c to complete the assembling process of the synchronous movement device on the first and second shafts 10, 20.

It should be noted that in the step c, the pivoted ends 111b, 122b of the first and second drive shafts 111, 122 have a configuration identical to that of the pivoted ends 10b, 20b of the first and second shafts 10, 20. In a modified embodiment, the pivoted ends 111b, 122b of the first and second drive shafts 111, 122 have hollow sections, whereby the front ends of the pivoted ends 10b, 20b of the first and second shafts 10, 20 can enter the hollow sections to line up the pivoted ends 111b, 122b of the first and second drive shafts 111, 122 and the pivoted ends 10b, 20b of the first and second shafts 10, 20. This makes it easier to drive the push section 103 to push the first and second rotors 11, 22 (or the third and fourth rotors 33, 44) onto the first and second shafts 10, 20.

In comparison with the conventional device, the dual-shaft synchronous movement device of the present invention has the following advantages:

1. The rotary shafts (the first and second shafts 10, 20) are the relevant components (such as the first and second rotors 11, 22 and the drive section A 50 wound thereon and the third and fourth rotors 33, 44 and the drive section B 60 wound thereon) together form a synchronous movement mechanism. This structure is apparently different from the conventional device, which employs multiple gaskets, frictional plates and cooperative springs for storing energy and releasing the energy.

2. The first and second rotors 11, 22 (or the third and fourth rotors 33, 44) and the cooperative drive section A 50 (or drive section B 60) wound thereon together form a transmission structure of the synchronous movement mechanism. The synchronous movement mechanism is mounted between the display module 91 and the apparatus body module 92. When an operator 0°~180° rotates the display module 91, the apparatus body module 92 will synchronously relatively rotate by 0°~180°. Accordingly, the total rotational angle of the display module 91 and the apparatus body module 92 is 360° That is, by means of the synchronous movement device, a user can operate and rotate the display module 91 by a certain angle or range to achieve a travel double the rotational angle or range. Accordingly, the user can more quickly and conveniently operate the electronic apparatus in more operation modes (or application ranges).

3. The first and second drive shafts 111, 122 of the assembling device 100 serve to drive the first and second rotors 11, 22 (or the third and fourth rotors 33, 44) to rotate so as to wind the drive section 50 (or 60) on the first and second rotors 11, 22 (or the third and fourth rotors 33, 44). The push section 103 can be reciprocally moved along the first and second drive shafts 111, 122 to push the first and second rotors 11, 22 (or the third and fourth rotors 33, 44) onto the pivoted ends 10b, 20b of the first and second shafts to achieve the dual-shaft (first and second shafts 10, 20) synchronous movement device. The above assembling method is simple.

In conclusion, the synchronous movement device of the present invention is different from and advantageous over the conventional device. Also, the assembling method of the synchronous movement device is simple and effective.

The above embodiments are only used to illustrate the present invention, not intended to limit the scope thereof. Many modifications of the above embodiments can be made without departing from the spirit of the present invention.

What is claimed is:

1. An assembling method for a dual-shaft synchronous movement device, comprising steps of:
    a. providing an assembling device and arranging a first rotor and a second rotor provided with a drive section A on the assembling device, the first and second rotors being formed with shaft holes, the assembling device including a base section, two drive shafts disposed on the base section and a push section, the push section being reciprocally movable along the drive shafts, each of the first and second drive shafts having a drive end and a pivoted end;
    b. rotating at least one of the first and second drive shafts to drive at least one of the first and second rotors to rotate so as to wind the drive section A on the first and second rotors in a tensioned state; and
    c. aligning the pivoted ends of the first and second drive shafts of the assembling device with the pivoted ends of the first and second shafts and driving the push section to move forward along the first and second drive shafts so as to push the first and second rotors onto the first and second shafts and forcedly make the pivoted ends of the first and second shafts fitted into the shaft holes to complete the assembling process of the synchronous movement device on the first and second shafts.

2. The assembling method for the dual-shaft synchronous movement device as claimed in claim 1, wherein in step a, a third rotor and a fourth rotor provided with a drive section B are further arranged on the assembling device, the third and fourth rotors being formed with shaft holes.

3. The assembling method for the dual-shaft synchronous movement device as claimed in claim 2, wherein the pivoted ends of the first and second drive shafts have a cross-sectional shape identical to that of the pivoted ends of the first and second shafts and that of the shaft holes of the third and fourth rotors.

4. The assembling method for the dual-shaft synchronous movement device as claimed in claim 2, wherein in step a, the third and fourth rotors are respectively arranged on the pivoted ends of the first and second drive shafts.

5. The assembling method for the dual-shaft synchronous movement device as claimed in claim 2, wherein in step b, at least one of the third and fourth rotors is also rotated so as to wind the drive section B on the third and fourth rotors in a tensioned state.

6. The assembling method for the dual-shaft synchronous movement device as claimed in claim 5, wherein in step c, the push section is driven to also push the third and fourth rotors onto the first and second shafts and forcedly make the pivoted ends of the first and second shafts fitted into the shaft holes.

7. The assembling method for the dual-shaft synchronous movement device as claimed in claim 5, wherein in step b, according to the winding direction of the third and fourth rotors, the first and second drive shafts are rotatable in the same direction or in different directions.

8. The assembling method for the dual-shaft synchronous movement device as claimed in claim 5, wherein in step b, the first and second drive shafts are synchronously or asynchronously rotatable.

9. The assembling method for the dual-shaft synchronous movement device as claimed in claim 5, wherein in step b, the drive section B is wound on the third rotor by a length smaller than a length by which the drive section B is wound on the fourth rotor.

10. The assembling method for the dual-shaft synchronous movement device as claimed in claim 5, wherein in step b, the drive section B has such a length that after the fourth rotor is 180° rotated along with the second drive shaft, the drive section B is still wound on the fourth rotor by a length at least equal to ½ circumferential length of the fourth rotor.

11. The assembling method for the dual-shaft synchronous movement device as claimed in claim 1, wherein the pivoted ends of the first and second drive shafts have a cross-sectional shape identical to that of the pivoted ends of the first and second shafts and that of the shaft holes of the first and second rotors.

12. The assembling method for the dual-shaft synchronous movement device as claimed in claim 1, wherein the push section has the form of a board block having two assembling holes, the pivoted ends of the first and second drive shafts being respectively fitted in the assembling holes, whereby the push section is reciprocally movably assembled on the pivoted ends of the first and second drive shafts.

13. The assembling method for the dual-shaft synchronous movement device as claimed in claim 1, wherein in step a, the first and second rotors are respectively arranged on the pivoted ends of the first and second drive shafts.

14. The assembling method for the dual-shaft synchronous movement device as claimed in claim 1, wherein in step b, according to the winding direction of the first and second rotors, the first and second drive shafts are rotatable in the same direction or in different directions.

15. The assembling method for the dual-shaft synchronous movement device as claimed in claim 1, wherein in step b, the first and second drive shafts are synchronously or asynchronously rotatable.

16. The assembling method for the dual-shaft synchronous movement device as claimed in claim 1, wherein in step b, the drive section A is wound on the first rotor by a length larger than a length by which the drive section A is wound on the second rotor.

17. The assembling method for the dual-shaft synchronous movement device as claimed in claim 1, wherein in step b, the drive section A has such a length that after the first rotor is 180° rotated along with the first drive shaft, the drive section A is still wound on the first rotor by a length at least equal to ½ circumferential length of the first rotor.

18. The assembling method for the dual-shaft synchronous movement device as claimed in claim 1, wherein in step c, the pivoted ends of the first and second drive shafts have hollow sections, whereby front ends of the pivoted ends of the first and second shafts can enter the hollow sections to line up the pivoted ends of the first and second drive shafts and the pivoted ends of the first and second shafts.

* * * * *